(12) United States Patent
Sakurai et al.

(10) Patent No.: US 10,419,709 B2
(45) Date of Patent: Sep. 17, 2019

(54) VIDEO PROCESSING DEVICE, TRANSMITTING DEVICE, CONTROL PROGRAM, AND RECORDING MEDIUM

(71) Applicant: SHARP KABUSHIKI KAISHA, Sakai, Osaka (JP)

(72) Inventors: Ryoji Sakurai, Sakai (JP); Hideki Suzuki, Sakai (JP); Tomoo Nishigaki, Sakai (JP); Kazuyoshi Yoshiyama, Sakai (JP); Naoaki Shibamoto, Sakai (JP); Yasushi Tetsuka, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/079,065

(22) PCT Filed: Jun. 22, 2017

(86) PCT No.: PCT/JP2017/022956
§ 371 (c)(1),
(2) Date: Aug. 22, 2018

(87) PCT Pub. No.: WO2018/003644
PCT Pub. Date: Jan. 4, 2018

(65) Prior Publication Data
US 2019/0052832 A1 Feb. 14, 2019

(30) Foreign Application Priority Data
Jul. 1, 2016 (JP) .................. 2016-132058

(51) Int. Cl.
*H04N 5/57* (2006.01)
*H04N 5/38* (2006.01)
(Continued)

(52) U.S. Cl.
CPC ............. *H04N 5/57* (2013.01); *H04N 5/38* (2013.01); *H04N 7/007* (2013.01);
(Continued)

(58) Field of Classification Search
CPC ............ H04N 5/57; H04N 5/38; H04N 7/007; H04N 7/0806; H04N 9/77
(Continued)

(56) References Cited

U.S. PATENT DOCUMENTS

2003/0146919 A1* 8/2003 Kawashima ......... G09G 3/3406
345/609
2007/0024819 A1* 2/2007 Halls ..................... G03B 21/16
353/58
2012/0315011 A1 12/2012 Messmer et al.

FOREIGN PATENT DOCUMENTS

JP 2008-252761 A 10/2008
JP 2009-027550 A 2/2009
(Continued)

*Primary Examiner* — Sherrie Hsia
(74) *Attorney, Agent, or Firm* — ScienBiziP, P.C.

(57) ABSTRACT

A technology of preventing feeling of a viewer on brightness from significantly changing when content is switched is provided. A transmitting device (1) includes a calculation unit (12) that calculates a video feature of a transmission video signal, and a mute video generation unit (13) that generates a mute video posterior to a first video signal, in which luminance of the mute video is luminance corresponding to a value of a video feature relating to the first video signal.

7 Claims, 9 Drawing Sheets

(51) Int. Cl.
　　　*H04N 7/00*　　　　(2011.01)
　　　*H04N 7/08*　　　　(2006.01)
　　　*H04N 9/77*　　　　(2006.01)
　　　*H04N 21/44*　　　(2011.01)
　　　*H04N 21/4402*　　(2011.01)
　　　*H04N 9/74*　　　　(2006.01)

(52) U.S. Cl.
　　　CPC .............. *H04N 7/0806* (2013.01); *H04N 9/77* (2013.01); *H04N 21/44008* (2013.01); *H04N 21/440254* (2013.01); *H04N 9/74* (2013.01)

(58) Field of Classification Search
　　　USPC ................................ 348/687, 632, 723, 712
　　　See application file for complete search history.

(56) References Cited

FOREIGN PATENT DOCUMENTS

| | | |
|---|---|---|
| JP | 2013-520874 A | 6/2013 |
| JP | 2014-170179 A | 9/2014 |

\* cited by examiner

FIG. 5

```
CalculateMaxFALL()
{
    set MaxFALL = 0
    for each ( frame in the sequence )
    {
        set runningSum = 0
        for each ( pixel in the active image area of the frame )
        {
            convert the pixel's non-linear (R',G',B') values to linear values (R,G,B) calibrated to cd/m²
            set maxRGB = max(R,G,B)
            set runningSum = runningSum + maxRGB
        }
        set frameAverageLightLevel = runningSum / numberOfPixelsInActiveImageArea
        if( frameAverageLightLevel > MaxFALL )
            set MaxFALL = frameAverageLightLevel
    }
    return MaxFALL
}
```

FIG. 6-1

```
CalculateCPL()
{
    set CPL = 0
    set BkFrame = WtFrame = 0
    set BkFrameAL = WtFrameAL = 0 for each ( frame in the sequence )
    {
        set runningSum = 0
        for each ( pixel in the active image area of the frame )
        {
            calculate the pixel's linear luminance value Y
            set runningSum = runningSum + Y
        }
        set frameAverageLuminance = runningSum / numberOfPixelsInActiveImageArea if( flameAverageLuminance < Bk)
        {
            if ( BkFrame = 0 ) { set BkFrame = BkFrame + 1; set BkFrameAL = frameAverageLuminance }
            else { set BkFrame = BkFrame + 1; set BkFrameAL = BkFrameAL + frameAverageLuminance }
        }
        else if(flameAverageLuminance > Wt)
        {
            if ( WtFrame = 0 ) { set WtFrame = WtFrame + 1; set WtFrameAL = frameAverageLuminance }
            else { set WtFrame = WtFrame + 1; set WtFrameAL = WtFrameAL + frameAverageLuminance }
        }

CalculateY(Rin, Gin, Bin)
        {
            set R = EOTF(Rin)
            set G = EOTF(Gin)
            set B = EOTF(Bin)
            return Y = 0.2627R + 0.6780G + 0.0593B
        }
    }
}
```

FIG. 6-2

```
    else
    {
        if( BkFrame >0 ) {
            calculate average frame luminance value (AFL) from BkFrame & BkFrameAL
            set CPL = average(CPL, AFL)
            set BkFrame = BkFrameAL = 0
        } else if( WtFrame > 0 ) {
            calculate average frame luminance value (AFL) from WtFrame & WtFrameAL
            set CPL = average(CPL, AFL)
            set WtFrame = WtFrameAL = 0
        } else {
            set CPL = average(CPL, frameAverageLuminance )
        }
    }
    return CPL
}
```

VIDEO PROCESSING DEVICE, TRANSMITTING DEVICE, CONTROL PROGRAM, AND RECORDING MEDIUM

TECHNICAL FIELD

The present invention relates to a video processing device, a transmitting device, a control program, and a recording medium.

BACKGROUND ART

In a technology related to voice, there is a known technology of equalizing feeling of a viewer on a magnitude of a sound for each content by using loudness which is the magnitude of the sound perceived by a person. In addition, in a technology related to video, high luminance such as HDR can be displayed, and opportunity is increasing in which the feeling of the viewer on brightness is significantly changed for each content.

CITATION LIST

Patent Literature

PTL 1: Japanese Unexamined Patent Application Publication No. 2009-27550 (published on Feb. 5, 2009)

SUMMARY OF INVENTION

Technical Problem

If feeling of a viewer on brightness is significantly changed for each content, a psychological burden of the viewer may be increased in some cases. For example, a black screen is usually displayed at the time of channel switching or content switching at timing when video cannot be displayed. However, since HDR has a large variation width of luminance, compared with SDR, in a case where luminance of the content before switching is high, if the black screen is displayed, a luminance difference is large and the viewer sometimes feels uncomfortable.

The present invention provides a technology to prevent feeling of a viewer on brightness from changing significantly when content is switched.

Solution to Problem

In order to solve the above problems, a video processing device according to an aspect of the present invention includes a calculation unit that calculates video feature a transmission video signal, and a mute video generation unit that generates a mute video inserted into the video signal, in which the mute video generation unit sets luminance of the mute video to a value corresponding to a video feature of a video signal represented prior to the mute video in time.

Advantageous Effects of Invention

According to one embodiment of the present invention, feeling of a viewer on brightness is not significantly changed at the time of content switching, and unnecessary psychological burden of the viewer can be reduced.

BRIEF DESCRIPTION OF DRAWINGS

FIG. 5 is an example of a pseudo code for calculating MaxFALL.

FIG. 6-1 is an example of the pseudo code for calculating a sense luminance value in Embodiment 1 of the present invention.

FIG. 6-2 is an example of the pseudo code for calculating the sense luminance value in Embodiment 1 of the present invention.

DESCRIPTION OF EMBODIMENTS

Hereinafter, embodiments of the present invention will be described in detail. However, a configuration described in the present embodiment is not intended to limit the scope of the present invention to that only as long as there is no specific description in particular, and is merely an explanatory example.

A video processing device according to the present invention includes a calculation unit that calculates a video feature of a transmission video signal and a mute video generation unit that generates a mute video to be inserted into the video signal, and the mute video generation unit sets luminance of a mute video so as to be a value corresponding to the video feature of the video signal represented prior to a mute video in time.

Here, the video feature is an index indicating sense brightness of the video. A sense luminance value or the like can be used as an example of the video feature. The sense luminance value is an index representing a sense of brightness calculated from a luminance value of the video signal. An average luminance value, a maximum luminance value, a median value of a luminance value histogram, Maximum Frame Average Light Level (MaxFALL), a combination thereof, and the like can be used as an example of the sense luminance values. The video feature includes not only an index calculated from the luminance value of the video signal like the sense luminance value but also an index calculated from chromaticity of the video signal.

In the present specification, a "mute video" indicates video data inserted into a display video, or an image represented by the video data, at timing of switching between two different contents, switching of scenes in the content, or the like.

Embodiment 1

(Transmitting Device)

Figure 1:
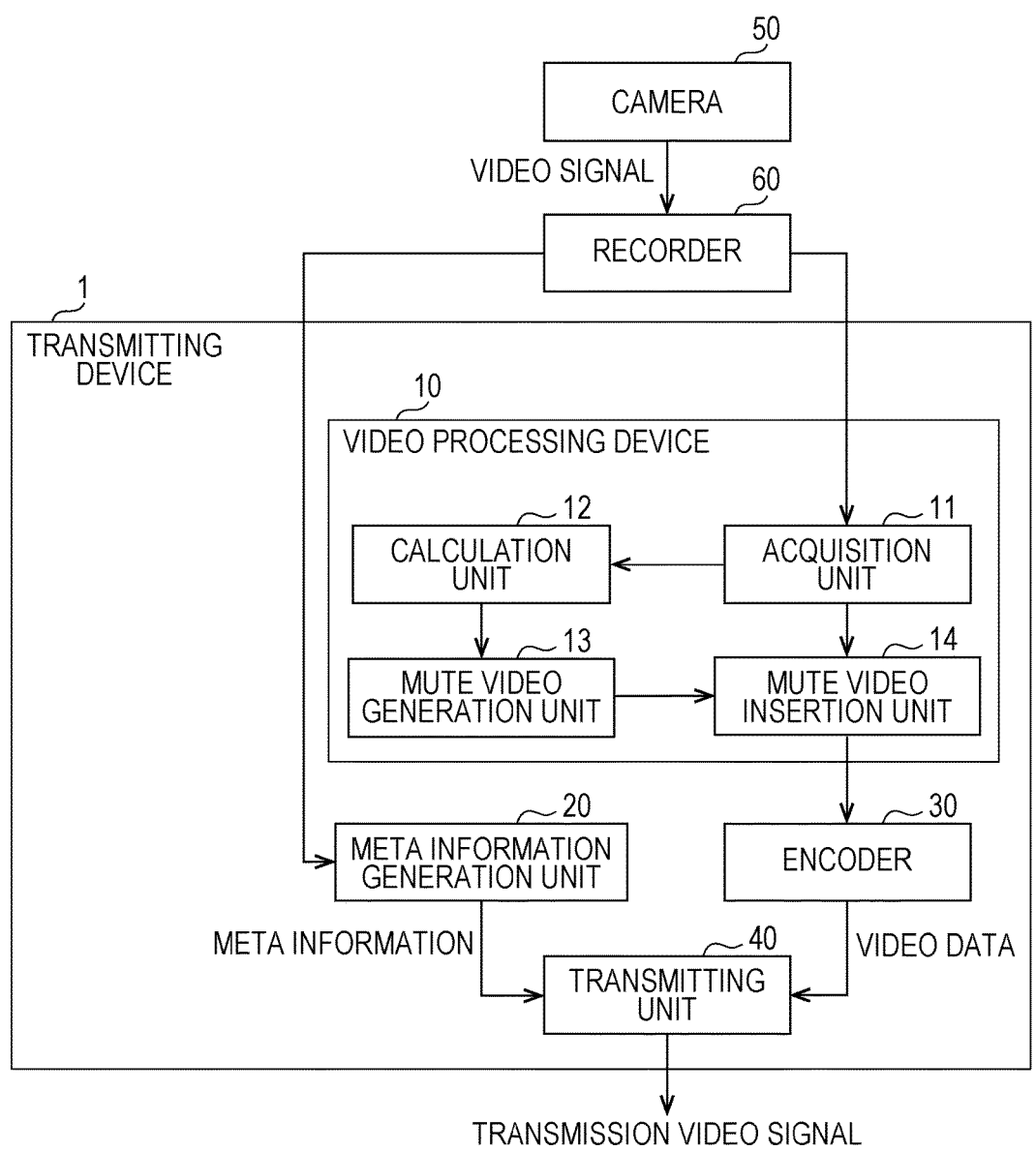
FIG. 1 is a block diagram illustrating a configuration of a transmitting device according to Embodiment 1 of the present invention.

A transmitting device 1 including a video processing device 10 according to Embodiment 1 will be described with reference to FIG. 1. FIG. 1 is a block diagram illustrating a configuration of the transmitting device 1 including the video processing device 10 according to the present embodiment. The transmitting device 1 includes a video processing device 10, a meta information generation unit 20, an encoder 30, and a transmitting unit 40.

For example, a camera 50 and a recorder 60 may be used as an external configuration of the transmitting device 1. The camera 50 captures a video and outputs a video signal of the captured video to the recorder 60. The recorder 60 records the input video signal and outputs the recorded video signal to the transmitting device 1. The transmitting device 1 acquires the input video signal by the video processing device 10 and the meta information generation unit 20. The video signal may be directly output from the camera 50 to the transmitting device 1 without passing through the recorder 60.

(Video Processing Device)

The video processing device 10 is a device that sequentially outputs a plurality of frames configuring a video by decoding a video signal, and includes an acquisition unit 11, a calculation unit 12, a mute video generation unit 13, and a mute video insertion unit 14.

The acquisition unit 11 acquires a video signal input from the recorder 60 or the camera 50. The acquisition unit 11 outputs the acquired video signal to the calculation unit 12 and the mute video insertion unit 14.

The calculation unit 12 calculates a video feature of each content (program and CM) included in the video signal with reference to an average luminance, a maximum luminance, a median value of a luminance value, and MaxFALL of the video data of the input video signal. In other words, the calculation unit 12 calculates the video feature relating to the video signal. Here, the median value of the luminance value may be any one of an average median value obtained by averaging median values of the luminance values per frame over a plurality of frames, and a median value of a histogram over a plurality of frames, based on the average luminance value per frame. An example of calculating the video feature will be described below.

The calculation unit 12 may calculate a second average luminance value which is an average luminance value of each frame in a plurality of frames included in the input video signal, may calculate a first average luminance value by averaging the second average luminance value in the plurality of frames, and may set the first average luminance value as a video feature. When calculating the second average luminance value, the calculation unit 12 may calculate the second average luminance value in an active image area excluding a luminance value greater than or equal to the predetermined value, as will be described below.

The calculation unit 12 outputs the calculated video feature to the mute video generation unit 13. A specific description of the video feature will be made below.

The mute video generation unit 13 sets the luminance value of the mute video so as to be a value corresponding to the video feature of each input content and generates a mute video having the luminance value. In addition, the mute video generation unit 13 sets the luminance value of the mute video such that the mute video becomes a value corresponding to the video feature of the last content, with respect to the mute video inserted posterior to the last content included in the video signal, and generates a mute video having the luminance value. For example, the mute video generation unit 13 sets the luminance of the mute video such that a difference between (1-1) luminance of the mute video, and (1-2) a sense luminance value of the video signal displayed prior to the mute video in time is within a predetermined range. Here, "prior to the mute video in time" means, for example, immediately before the mute video.

In the present specification, the "video signal displayed prior to the mute video in time" is also referred to as a "first video signal". Here, "posterior to the first video signal" means, for example, shortly after the first video signal, but is not limited thereto. In addition, the "video signal displayed posterior to the mute video" is also referred to as a "second video signal". In addition, the expression "video signal" used without attaching "first" and "second" may be used to include at least one of the first video signal and the second video signal described above.

In addition, "to be within a predetermined range" also includes a case where luminance value of mute video=sense luminance value of video data, and also includes a case where

|luminance value of mute video−sense luminance value|/ sense luminance value≤A (for example A=0.1) (here, the notation |X| denotes an absolute value of X). In addition, the predetermined range of the video data can be set appropriately. In addition, the predetermined range also includes variation of a value due to a calculation error caused by rounding or the like.

The mute video generation unit 13 outputs the generated mute video to the mute video insertion unit 14.

By using the video signal input from the acquisition unit 11 and the mute video input from the mute video generation unit 13, the mute video insertion unit 14 inserts the mute video between each content included in the video signal. The mute video insertion unit 14 outputs the video signal into which the mute video is inserted to the encoder 30.

(Other Members)

The meta information generation unit 20 generates meta information of the video signal, based on the input video signal. The meta information generation unit 20 outputs the generated meta information to the transmitting unit 40. The meta information includes an average luminance, a maximum luminance, a median value of luminance values, MaxFALL, and the like which indicate luminance values of each content.

The encoder 30 outputs a video signal into which a mute video is inserted from the video processing device 10. The encoder 30 encodes the input video signal and generates video data. The encoder 30 outputs the generated video data to the transmitting unit 40.

The transmitting unit 40 includes (1-3) meta information input from the meta information generation unit 20, and (1-4) video data input from the encoder 30 in the transmission video signal, and transmits the transmission video signal to the display device.

Here, the transmission video signal which is transmitted by the transmitting unit 40 can be an HDMI signal based on the High-Definition Multimedia Interface (HDMI) (registered trademark) standard, a Tuner signal (signal received by a tuner), an HDR signal such as Composite Video, Blanking, and Sync (CVBS: composite video signal) signal.

(Display Device)

The display device includes a reception unit, a video control unit, an operation reception unit, a panel control unit, and a display panel. The reception unit receives a transmission video signal transmitted from the transmitting device 1 and outputs the transmission video signal to the video control unit. The video control unit decodes the input video signal and outputs the decoded video data to the panel control unit. The panel control unit performs tone-mapping of the video data input from the video control unit, thereby, displaying the video data on the display panel with appropriate luminance. The tone mapping is to determine how much luminance that can be expressed on the display panel can be assigned to luminance information included in a video signal. The operation reception unit receives an operation made by a user. There is an operation of starting display of the video, an operation of stopping the display video, and the like, as an example of the operation received by the operation reception unit.

(Mute Video Generation Processing)

Figure 2:
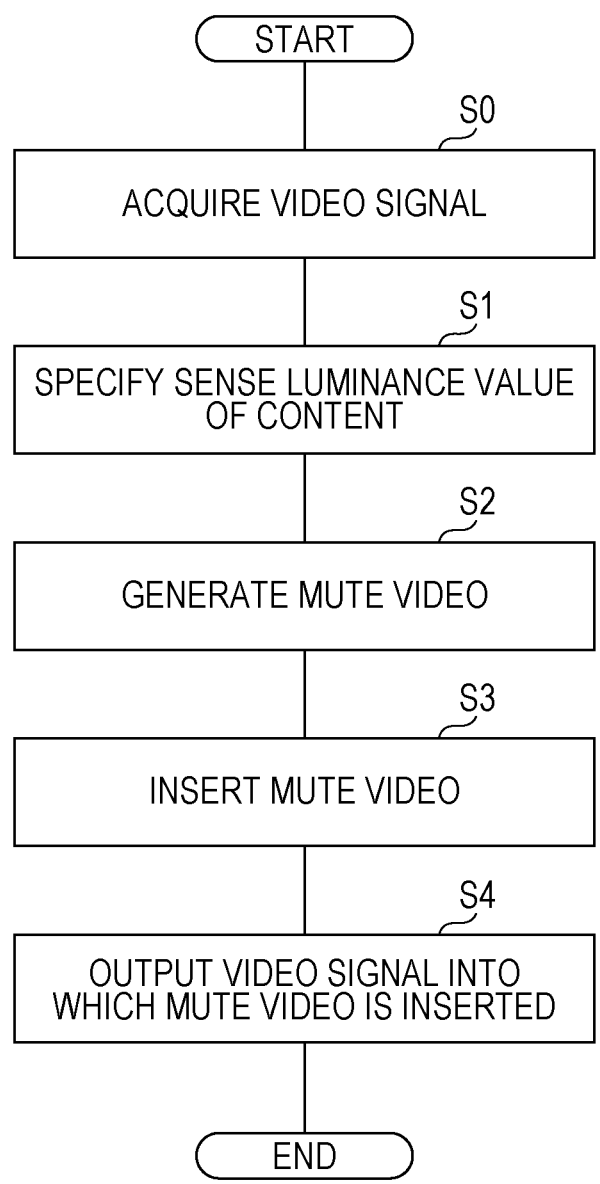
FIG. 2 is a flowchart illustrating a mute video generation method according to Embodiment 1 of the present invention.

A flow of mute video generation processing performed by the video processing device 10 according to the present embodiment will be described with reference to FIG. 2. FIG. 2 is a flowchart illustrating the flow of the mute video generation processing.

The video processing device 10 according to the present embodiment generates a mute video in which a luminance value is set by performing steps S0 to S4 which will be described below.

First, the acquisition unit 11 acquires a video signal (step S0). The acquisition unit 11 outputs the acquired video signal to calculation unit 12 and the mute video insertion unit 14.

Next, the calculation unit 12 specifies a video feature corresponding to each content included in the video signal by using the video signal input from the acquisition unit 11 (step S1).

Next, the mute video generation unit 13 acquires the video feature from the calculation unit 12. The mute video generation unit 13 sets a luminance value of the mute video so as to have a value corresponding to the acquired video feature with respect to the mute video which is inserted between each content. The mute video generation unit 13 generates the mute video having the luminance value (step S2).

Next, the mute video insertion unit 14 inserts the mute video input from the mute video generation unit 13 into the video signal input from the acquisition unit 11. The mute video insertion unit 14 inserts the mute video between each content included in the video signal and after the last content (step S3).

Next, the mute video insertion unit 14 outputs the video signal into which the mute video is inserted to the encoder 30. The encoder 30 codes the video signal and generates video data. The encoder 30 outputs the video data to the transmitting unit 40. The transmitting unit 40 acquires meta information of the video signal from the meta information generation unit 20. The transmitting unit 40 includes the video data and the meta information in the transmission video signal, and transmits the transmission video signal to the display device (step S4).

As described above, in the mute video generation processing according to the present embodiment, a luminance value of a mute video becomes a value corresponding to a sense luminance value of a video signal displayed prior to the mute video in time, and thus, it is possible to reduce a difference in luminance value between the mute video and the video signal displayed prior to the mute video and to reduce a psychological burden of a user due to a luminance difference.

Next, an example of the mute video generation processing in which the luminance value according to the present embodiment is set will be described more specifically with reference to FIGS. 3 and 4.

Figure 3:
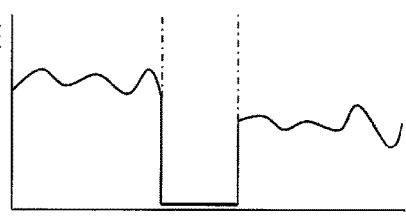
FIG. 3 is a diagram illustrating changes of luminance values of a mute video, (a) and (c) illustrate the luminance values of a display device in the related art, and (b) and (d) illustrate the luminance values of the display device according to Embodiment 1 of the present invention.

In (a) and (c) of FIG. 3 illustrates a change in luminance value when a display device in the related art sets the luminance value of the mute video, and (b) and (d) of FIG. 3 illustrates a change in luminance value when the transmitting device according to Embodiment 1 of the present invention sets the luminance value of the mute video.

As illustrated in (a) and (c) of FIG. 3, the luminance value of the mute video is 0 nit, and a difference in luminance value between the mute video and the content prior to and posterior to the mute video is large. As illustrated in (b) and (d) of FIG. 3, the mute video generation unit 13 according to the present embodiment sets the luminance value of the mute video such that a difference in luminance value between the mute video and the content displayed prior to the mute video in time is within a predetermined range. As a result, as illustrated in (b) and (d) of FIG. 3, the difference in luminance value between the mute video at the time of content switching and the content prior to and posterior to the mute video is reduced compared with (a) and (c) of FIG. 3.

Figure 4:
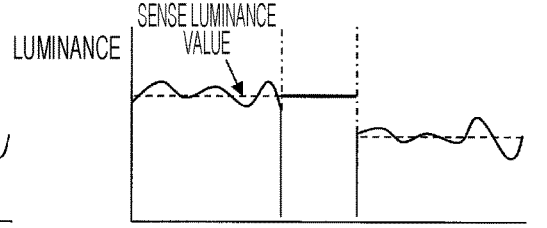
FIG. 4 is a graph illustrating a time-dependent change in luminance value of a display video, (a) illustrates the display device in the related art, and (b) illustrates the transmitting device according to Embodiment 1 of the present invention.

FIG. 4 illustrates a time-dependent change in luminance value of the display video (content and mute video). (a) of FIG. 4 illustrates a change in luminance value when a video processing device in the related art sets a luminance value of a mute video, and (b) of FIG. 4 illustrates a change in luminance value when the transmitting device 1 according to the present embodiment sets the luminance value of the mute video. As illustrated in (a) of FIG. 4, in the video processing device in the related art, a difference in luminance value between the mute video and the content prior to and posterior to the mute video is large. Meanwhile, as illustrated in (b) of FIG. 4, in the video processing device 10 according to the present embodiment, the mute video generation unit 13 sets the luminance value of the mute video such that a difference between (1-1) luminance of the mute video, and (1-2) a sense luminance value of the video signal displayed prior to the mute video in time.

As a result, in (b) of FIG. 4, the difference in luminance value between the mute video and the content prior to and posterior to the mute video is reduced compared with (a) of FIG. 4.

In the present embodiment, a case where a mute video is inserted between each content is used as an example, but a position into which the mute video is inserted is not limited in particular, and the mute video may be inserted posterior to the last content included in the video signal.

As described above, the video processing device 10 according to the present embodiment sets the luminance value of the mute video to a value within a predetermined range from the sense luminance value of the video data displayed prior to the mute video in time, and thus, it is possible to reduce the difference in luminance value between the mute video and the video data displayed prior to the mute video, and to reduce a psychological burden of a user due to a luminance difference.

(Calculation Example of Video Feature)

Hereinafter, a calculation example of video feature calculated by the calculation unit 12 will be described with reference to FIGS. 5 and 6.

In the present specification, the video feature indicates a feature relating to brightness of a target video.

A sense luminance value (CPL: Contents Perceptual Luminance) to be specifically described below can be used as an example of the video feature. The following description is merely an example of calculating the sense luminance value, and it is not intended to limit the description of the present specification thereby.

Example 1: Calculation Method Using MaxFALL

In the present example, the calculation unit 12 calculates a maximum frame average luminance Maximum Frame Average Light Level (MaxFALL), and sets the calculated MaxFALL as the sense luminance value. Here, MaxFALL is a maximum value of an average luminance in all the frames configuring a video, and an algorithm is specified by CEA 861.3. FIG. 6 illustrates a pseudo code for calculating MaxFALL.

As illustrated in FIG. 5, the calculation unit 12 converts (R', G', and B') which is a nonlinear pixel value into (R, G, and B) which is a linear luminance value that uses cd/m² (candela per square meter) as a unit, for each pixel included in an active image area in a certain frame.

Then, a maximum value of (R, G, and B) is set as a maximum luminance value maxRGB of a relevant pixel.

Then, the calculation unit 12 sets an average of the maximum luminance values maxRGB of all pixels included in the active image area as an average luminance flameAverageLightLevel in a relevant frame.

Furthermore, the calculation unit 12 sets the maximum average luminance flame AverageLightLevel among all the frames included in a video sequence as MaxFALL, and sets the MaxFALL as a sense luminance value of the target video.

For example, as will be described below, the active image area indicates an area obtained by excluding an area of a predetermined luminance value or more from the target frame, but is not limited thereto, and can also be set appropriately.

Example 2: Method of Excluding Black Screen and White Screen

In a case where a frame having a white screen (a screen having an average luminance greater than or equal to a threshold value Wt (Bk<Wt)) is included among all the frames included in the video sequence, a value of MaxFALL becomes a significantly large value, and thereby, the video feature calculated by the calculation unit 23 may not be suitable as a feature of the entire video sequence.

In the present example, the calculation unit 12 calculates a sense luminance value by excluding at least one of a black screen (a screen having an average luminance less than or equal to a threshold value Bk) and a white screen (a screen having an average luminance greater than or equal to the threshold value Wt (Bk<Wt)). More preferable sense luminance value can be calculated by using the present example for calculating the sense luminance value.

FIG. 6 illustrates a pseudo code for the calculation unit 12 to calculate the sense luminance value according to the present example. As illustrated in FIG. 6, the calculation unit 12 calculates a linear luminance value Y of the relevant pixel, for each pixel included in the active image area in a certain frame. Calculation of the linear luminance value Y is performed by the pseudo code illustrated within a dotted frame in FIG. 6. More specifically, the calculation unit 12 applies an Electro-Optical Transfer Function (EOTF) conversion to pixel values (Rin, Gin, Bin) of relevant pixels, thereby, calculating luminance values (R, G, and B) for each color of red, green, and blue, and furthermore, the luminance value Y is calculated by $$Y=0.2627R+0.6780G+0.0593B.$$

Then, the calculation unit 12 sets an average of the luminance values Y of all the pixels included in the active image area as an average luminance flameAverageluminance in the relevant frame, as illustrated in FIG. 6.

Furthermore, as illustrated in FIG. 6, the calculation unit 12 excludes at least one of a black screen (a screen having an average luminance less than or equal to the threshold value Bk) and a white screen (a screen having an average luminance greater than or equal to the threshold value Wt (Bk<Wt)), and thereafter, calculates the sense luminance value of the target video by taking an average of the average luminance flameAverageluminance. Although the specific values of the threshold values Bk (first threshold value) and Wt (second threshold value) do not limit the present embodiment, the specific values may be set to, for example, Bk=50, Wt=2000.

(Active Image Area)

Hereinafter, an active image area appearing in the above description will be described in more detail.

When calculating a frame luminance value per frame, the calculation unit 12 preferably calculates the frame luminance value by excluding an area having luminance greater than or equal to a predetermined threshold value.

Here, an image area excluding the area having the luminance greater than or equal to the predetermined threshold value is referred to as an active image area.

Processing of the calculation unit 12 in a case where a displayable maximum luminance of the display panel is 1000 nit and a predetermined threshold value is 200 nit will be described with reference to FIG. 7 as an example of the active image area.

Figure 7:
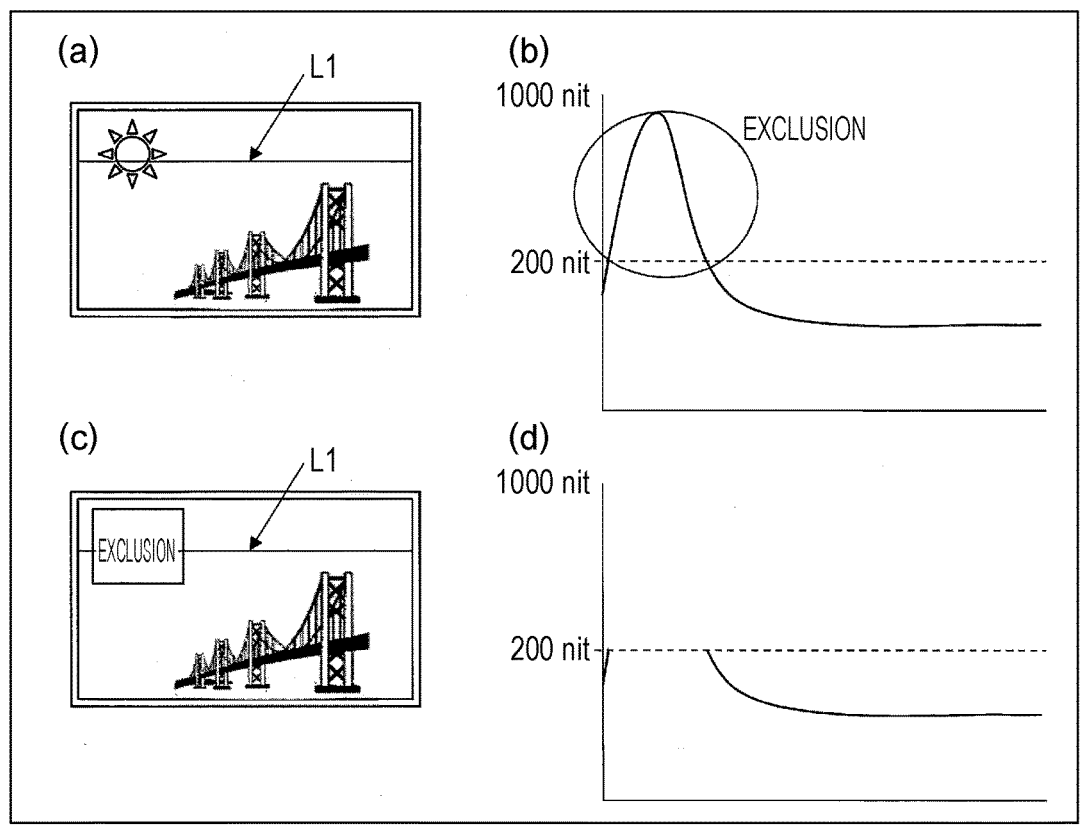
FIG. 7 is a diagram illustrating an example of a method of calculating the sense luminance value according to Embodiment 1 of the present invention, (a) and (b) are diagrams before a luminance value in a predetermined range is excluded, and (c) and (d) are diagrams after the luminance value in the predetermined range is excluded.

In the examples illustrated in (a) and (b) of FIG. 7, there is luminance exceeding 200 nit at the luminance along a line L1. In a case where an average of the luminance is calculated along the line L1 illustrated in (a) of FIG. 7, the calculation unit 12 calculates a frame luminance value in a high luminance area of 200 nit or higher which is a predetermined luminance, without using the luminance value of the area.

More specifically, the calculation unit 12 regards an area having luminance greater than or equal to the predetermined threshold value as an exclusion area as illustrated in (c) of FIG. 7, and the calculation unit 12 does not use luminance included in the exclusion area for calculating the frame luminance value as illustrated in (d) of FIG. 7. In other words, the calculation unit 12 calculates the frame luminance value with reference to the luminance included in the area other than the exclusion area.

Embodiment 2

The transmitting device 1 including the video processing device 10 according to a second embodiment will be described below with reference to FIG. 8. In the following description, description on the matters previously described in the above embodiment will be omitted, and points different from the above embodiment will be described.

The transmitting device 1 according to the present embodiment includes a mute video generation unit 13a instead of the mute video generation unit 13 included in the transmitting device 1 according to Embodiment 1 described above.

Figure 8:
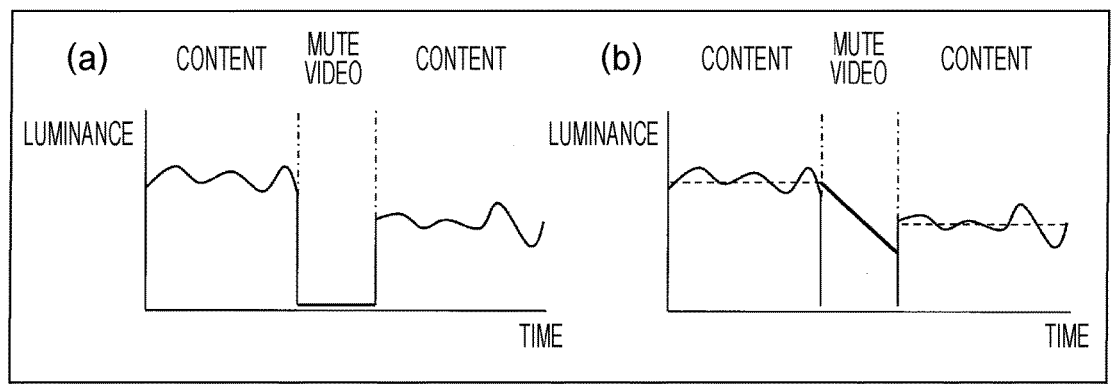
FIG. 8 is a graph illustrating a time-dependent change in luminance value of the display video, (a) illustrates the time-dependent change in luminance value of the display device in the related art, and (b) illustrates the time-dependent change in luminance value of the transmitting device according to Embodiment 2 of the present invention.

FIG. 8 illustrates a time-dependent change in luminance value of a display video. (a) of FIG. 8 illustrates a change in luminance value when a display device in the related art sets a luminance value of a mute video, and (b) of FIG. 8 illustrates a change in luminance value of when the transmitting device 1 according to the present embodiment sets the luminance value of the mute video. As illustrated in (b) of FIG. 8, the video processing device 10 according to the present embodiment is configured to gradually reduce the luminance value of the mute video.

Here, in the present specification, gradually reducing the luminance value includes reducing the luminance value step by step, and reducing the luminance value linearly or nonlinearly.

In addition, in the present embodiment, a rate of reducing the luminance value can be appropriately set according to a length of display time of the mute video, the luminance value to be reduced, and the like.

More specifically, the mute video generation unit 13a according to the present embodiment sets an initial value of luminance of the mute video such that a difference between (2-1) the luminance of the mute video and (2-2) the sense luminance value of the video signal (first video signal) displayed prior to the mute video in time is within a predetermined range, and sets the luminance value of the mute video so as to be decreased along time series from the initial value of the luminance of the mute video. As a result, in (b) of FIG. 8, the luminance value of the mute video is configured to be gradually reduced, and an abrupt variation of the luminance value is suppressed. Thereby, it is possible to reduce a psychological burden of a user due to the luminance difference.

In the present embodiment, a case where a mute video is inserted between each content is used as an example, but a position at which the mute video is inserted is not limited in particular, and the mute video may be inserted posterior to the last content included in the video signal. A reduction rate for reducing the luminance value is not limited to the present embodiment, and can be appropriately set.

Embodiment 3

The transmitting device 1 including the video processing device 10 according to Embodiment 3 will be hereinafter described with reference to FIG. 9. In the following description, description on the matters previously described in the above-described embodiments will be omitted, and points different from the above-described embodiments will be described.

The transmitting device 1 according to the present embodiment includes a mute video generation unit 13b instead of the mute video generation unit 13 included in the transmitting device 1 according to Embodiment 1.

Figure 9:
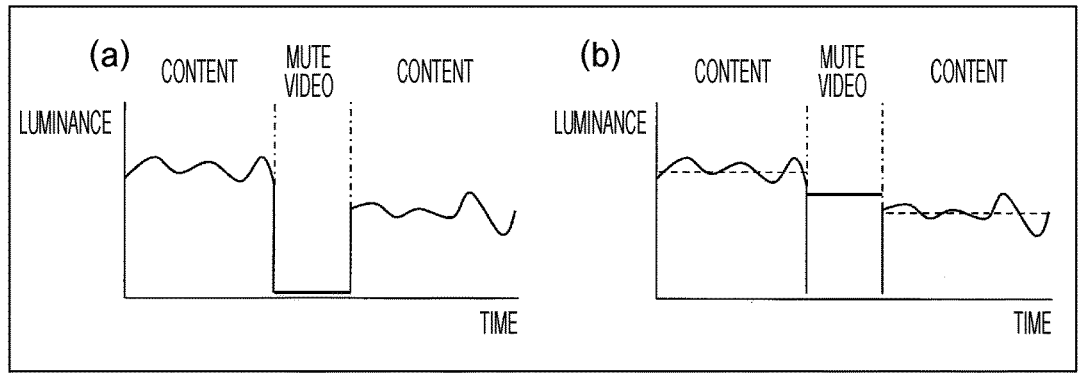
FIG. 9 is a graph illustrating a time-dependent change in luminance value of the display video, (a) illustrates the time-dependent change in luminance value of the display device in the related art, and (b) illustrates the time-dependent change in luminance value of the transmitting device according to Embodiment 3 of the present invention.

FIG. 9 illustrates a time-dependent change in luminance value of a display video. (a) of FIG. 9 illustrates a change in luminance value when the display device in the related art sets a luminance value of a mute video, and (b) FIG. 9 illustrates a change in luminance value when the transmitting device 1 according to the present embodiment sets the luminance value of the mute video. As illustrated in (b) of FIG. 9, the mute video generation unit 13b according to the present embodiment sets the luminance value of the mute video so as to be values corresponding to (3-1) a video feature of a certain content, and (3-2) a video feature of the next content and generates the mute video. In other words, the luminance value of the mute video is luminance corresponding to the video features relating to the first video signal and the second video signal. For example, the mute video generation unit 13b sets an average value of (3-1) and (3-2) described above as the luminance value of the mute video. The "certain content" corresponds to a video signal (first video signal) displayed prior to the mute video in time, and the "next content" corresponds to a video signal (second video signal) displayed posterior to the mute video in time.

As illustrated in (b) of FIG. 9, the video processing device 10 according to the present embodiment sets the average value of the luminance values of the content prior to and posterior to the mute video to the luminance value of the mute video, and thereby, a difference in luminance value between the mute video and the content prior to and posterior to the mute video is reduced.

As such, the video processing device 10 according to the present embodiment reduces not only a difference in luminance value between a mute video and video data displayed prior to the mute video, but also a difference in luminance value between the mute video and video data displayed posterior to the mute video. Thereby, it is possible to reduce a psychological burden of a user due to the luminance difference.

Embodiment 4

The transmitting device 1 including the video processing device 10 according to Embodiment 4 will be described hereinafter with reference to FIG. 10. In the following description, description on the matters previously described in the above embodiments will be omitted, and points different from the above embodiments will be described.

The transmitting device 1 according to the present embodiment includes a mute video generation unit 13c instead of the mute video generation unit 13 included in the transmitting device 1 according to Embodiment 1.

Figure 10:
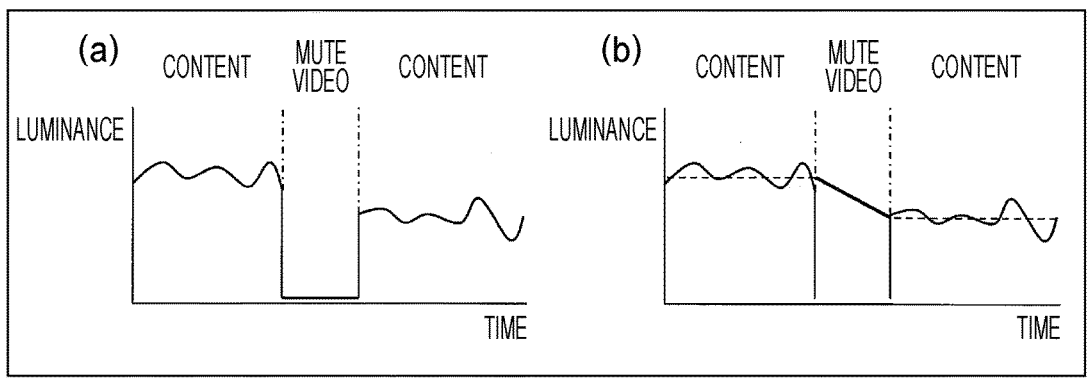
FIG. 10 is a graph illustrating a time-dependent change in luminance value of the display video, (a) illustrates the time-dependent change in luminance value of the display device in the related art, and (b) illustrates the time-dependent change in luminance value of the transmitting device according to Embodiment 4 of the present invention.

FIG. 10 illustrates a time-dependent change in luminance value of a display video. (a) of FIG. 10 illustrates a change in luminance value when the display device in the related art sets a luminance value of a mute video, and (b) of FIG. 10 illustrates a change in luminance value when the video processing device 10 according to the present embodiment sets the luminance value of the mute video. As illustrated in (b) of FIG. 10, the mute video generation unit 13c according to the present embodiment sets the luminance value of the mute video so as to be changed from a video feature of a certain content to a video feature of the next content in time series, and generates a mute video.

As such, the video processing device 10 according to the present embodiment gradually changes the luminance value of the mute video from the luminance value of the video signal (first video signal) displayed prior to the mute video to the luminance value of the video signal (second video signal) displayed posterior to the mute video, and suppresses an abrupt variation of the luminance value.

Thereby, it is possible to reduce a psychological burden of a user due to the luminance difference.

Embodiment 5

The transmitting device 1 including the video processing device 10 according to Embodiment 5 will be described hereinafter with reference to FIG. 11. In the following description, description on the matters previously described in the above embodiments will be omitted, and points different from the above embodiments will be described.

The transmitting device 1 according to the present embodiment includes a calculation unit 12d and a mute video generation unit 13d instead of the calculation unit 12 and the mute video generation unit 13 included in the transmitting device 1 according to the above embodiment.

Figure 11:
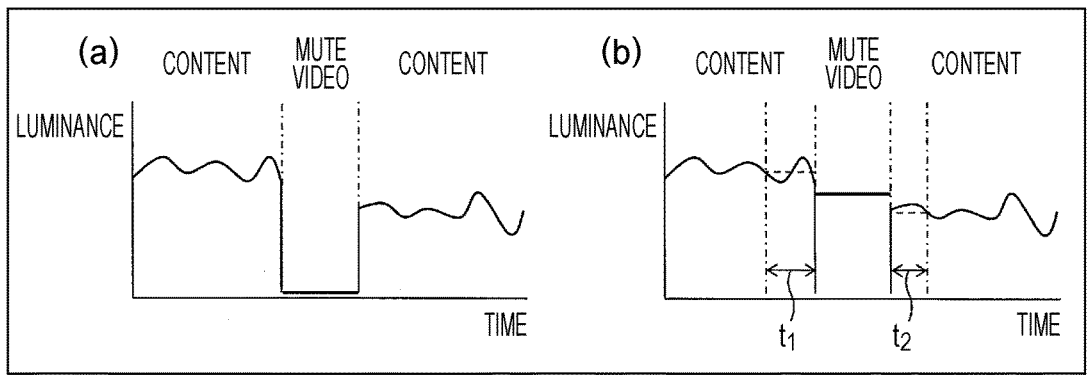
FIG. 11 is a graph illustrating a time-dependent change in luminance value of the display video, (a) illustrates the time-dependent change in luminance value of the display device in the related art, and (b) illustrates the time-dependent change in luminance value of the transmitting device according to Embodiment 5 of the present invention.

FIG. 11 illustrates a time-dependent change in luminance value of a display video. (a) of FIG. 11 illustrates a change in luminance value when the display device in the related art sets a luminance value of a mute video, and (b) of FIG. 11 illustrates a change in luminance value when the video processing device 10 according to the present embodiment sets the luminance value of the mute video. As illustrated in (b) of FIG. 11, the video processing device 10 according to the present embodiment sets the luminance value of the muted video, based on a video feature within a predetermined period of the content prior to and posterior to the mute video. Here, $t_1$ indicates a predetermined period at the end of the content prior to the mute video, and $t_2$ indicates a predetermined period at the beginning of the content posterior to the mute video.

When calculating video features of each content, the calculation unit 12d calculates a video feature of a video signal within a predetermined period prior to the mute video in time and a video feature of a video signal within a predetermined period posterior to the mute video in time in addition to the video feature of each content calculated in Embodiment 1. The calculation unit 12 d outputs the video feature to the mute video generation unit 13. Here, more specifically, "prior to the mute video in time" is "immediately before the mute video" and "posterior to the mute video" is "shortly after the mute video". In addition, the "predetermined period" can be appropriately set like, for example, one second, three seconds, and 10 seconds. In addition, the predetermined period may be set according to the content included in the video signal.

The mute video generation unit 13d sets as the luminance value of the mute video so as to be a value corresponding to (5-1) a video feature of a certain content (first video signal), and (5-2) a video feature of the next content (second video signal).

Here, the mute video generation unit 13d sets at least one of the video features of (5-1) and (5-2) described above as the video feature of the video signal within the above-described predetermined period, and sets the luminance value of the mute video.

The mute video generation unit 13d according to the present embodiment can set the luminance value of the mute video through the same processing as in Embodiment 1 to Embodiment 4, except that the video feature is set as the video feature of the video signal within the above-described predetermined period.

As such, the video processing device 10 according to the present embodiment can set a luminance value of a mute video, based on a video feature in the vicinity of the mute video, and thus, it is possible to further reduce a difference in luminance value between the mute video and video data displayed prior to and posterior to the mute video. Thereby, it is possible to reduce a psychological burden of a user due to the luminance difference.

Embodiment 6

The transmitting device 1 including the video processing device 10 according to Embodiment 6 will be described hereinafter with reference to FIG. 12. In the following description, description on the matters previously described in the above embodiments will be omitted, and points different from the above embodiments will be described.

The transmitting device 1 according to the present embodiment includes a calculation unit 12e and a mute video generation unit 13e instead of the calculation unit 12 and the mute video generation unit 13 included in the transmitting device 1 according to above-described Embodiment 1.

The calculating unit 12c calculates a sense chromaticity value in each content included in a video signal with reference to at least one several pieces of chromaticity information such an average chromaticity, a maximum chromaticity, a median value of chromaticity values, and Max-FALL of video data input from the acquisition unit 11.

The calculation unit 12e outputs the calculated sense chromaticity value to the mute video generation unit 13e. The mute video generation unit 13e sets the chromaticity value of the mute video so as to be a value according to the input sense chromaticity value and generates a mute video having the chromaticity value.

a color gamut based on ITU-R BT.2020 or ITU-R BT.709 may be used as a color gamut set by the mute video generation unit 13e.

As such, in the present embodiment, chromaticity of a mute video can be set instead of the luminance value of the mute video in the above embodiment, and the mute video can be generated.

Figure 12:
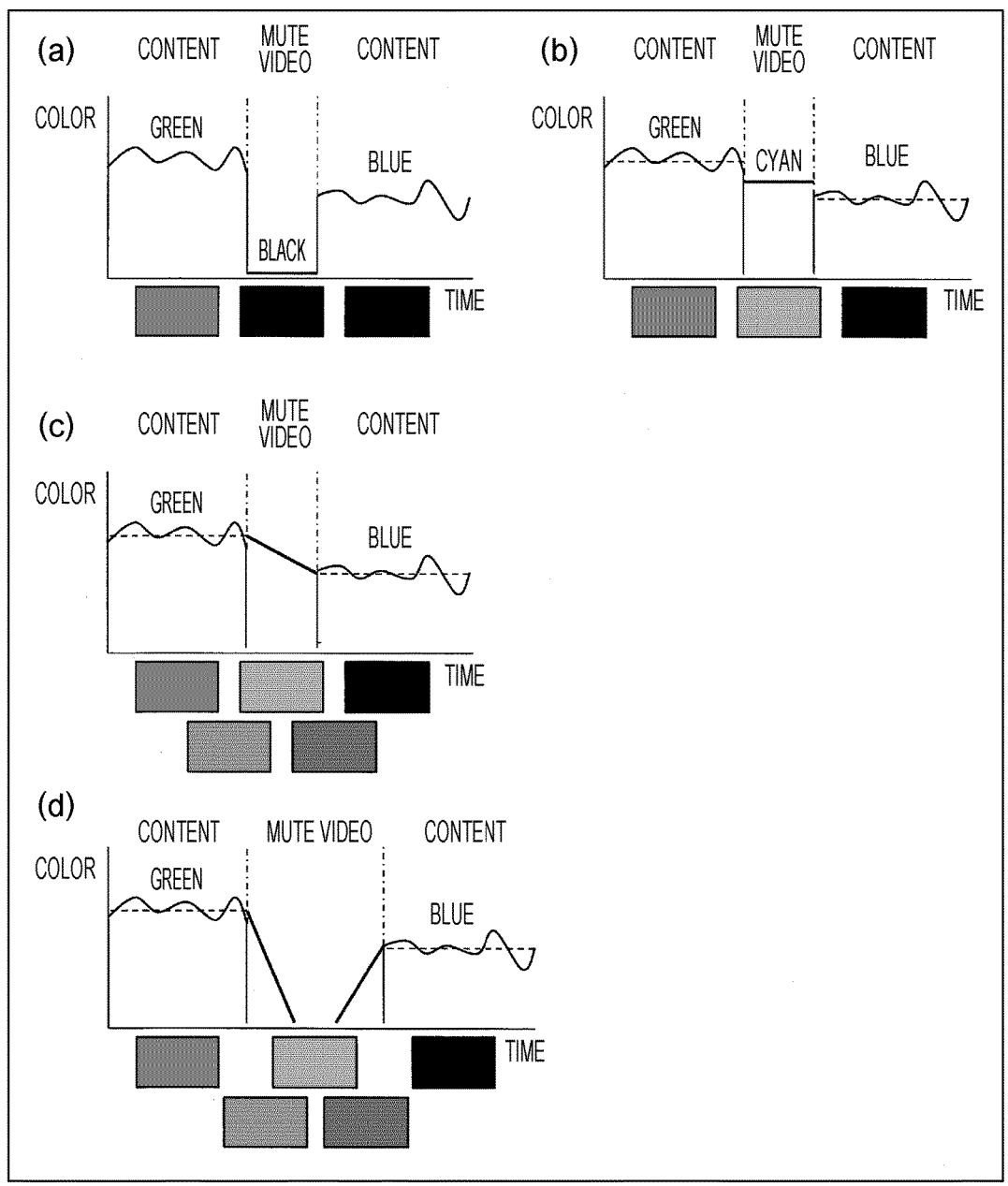
FIG. 12 is a graph illustrating a time-dependent change in luminance value of the display video, (a) is a graph illustrating the time-dependent change in chromaticity of the video processing device in the related art, and (b), (c), and (d) are graphs illustrating an example of the time-dependent change in chromaticity of the video processing device according to the present embodiment.

FIG. 12 illustrates a time-dependent change in chromaticity value of a display video. (a) of FIG. 12 illustrates the time-dependent change in chromaticity value of a video processing device in the related art, and (b), (c), and (d) of FIG. 12 illustrate an example of the time-dependent change in chromaticity value of the video processing device 10 according to the present embodiment. FIG. 12 illustrates the time-dependent change when a color of the current content is set to green and a color of the next content is set to blue, as an example of the time-dependent change in the chromaticity value.

In the video processing device in the related art, values of the chromaticity and luminance are 0, and thereby, a color of the mute video becomes black as illustrated in (a) of FIG. 12. In addition, a difference in chromaticity value between the mute video and the contents prior to and posterior to the mute video is increased.

As illustrated in (b) of FIG. 12, the color of the mute video is set to cyan in an example of the video processing device 10 according to the present embodiment. That is, in the present example, the chromaticity value of the mute video is set as an average value of the chromaticity values of the content prior to and posterior to the mute video.

Thereby, it is possible to reduce the difference in chromaticity value between the mute video and the content prior to and posterior to the mute video.

As illustrated in (c) of FIG. 12, in the example of the video processing device 10 according to the present embodiment, the color of the mute video is gradually changed from green to blue. In other words, in the present example, the chromaticity value of the mute video is gradually changed from the chromaticity value of the display video displayed prior to the mute video to the chromaticity value of the display video displayed posterior to the mute video. Thereby, it is possible to suppress an abrupt variation in chromaticity value.

As illustrated in (d) of FIG. 12, in the example of the video processing device 10 according to the present embodiment, the color of the mute video is gradually changed from green to gray, and thereafter, is gradually changed from gray to blue. That is, in the present example, the chromaticity value of the mute video is gradually changed from the chromaticity value of the display video displayed prior to the mute video to zero, and thereafter, is gradually changed from zero to the chromaticity value of the display video displayed posterior to the mute video.

Thereby, it is possible to reduce influence of the color of the content prior to and posterior to the mute video when an abrupt variation in chromaticity value is suppressed.

As such, the video processing device 10 according to the present embodiment can reduce a psychological burden of a user due to the chromaticity difference.

[Implementation Example by Software]

Control blocks (particularly, the calculation unit 12, the mute video generation unit 13, and the mute video insertion unit 14) of the video processing device 10 may be realized by a logic circuit (hardware) formed in an integrated circuit (IC chip) and the like, or may be realized by software using a Central Processing Unit (CPU).

In the latter case, the video processing device 10 includes a CPU that executes an instruction of a program which is software for performing each function, a Read Only Memory (ROM) or a storage device (this is referred to as a "recording medium") in which the program and various data are recorded so as to be capable of being read by a computer (or the CPU), a random access memory (RAM) that develops the program, and the like. The object of the present invention is achieved by the computer (or the CPU) reading the program from the recording medium and executing the program. A "non-transitory tangible medium", for example, a tape, a disk, a card, a semiconductor memory, a programmable logic circuit, or the like can be used as the recording medium. In addition, the program may be supplied to the computer via a certain transfer medium (a communication network, a broadcast wave, or the like) capable of transferring the program. One aspect of the present invention can also be realized by a form of a data signal which is obtained by embodying the program through an electronic transfer and is embedded in a carrier wave.

APPENDIX

In the present specification, "calculation" includes derivation, arithmetic, computing, guidance, and the like.

In addition, in the present specification, "generation" includes making, producing, making-out, creating, creation, and the like.

In addition, in the present specification, "insertion" includes introduction, pinching, plug-in, incorporation, and the like.

In addition, "sense luminance value" in the present specification includes visual luminance, visually corrected luminance, sensibility luminance, sensory luminance, and the like.

SUMMARIZATION

The transmitting device 1 according to Aspect 1 of the present invention includes a calculation unit 12 that calculates a video feature of a transmission video signal, and a mute video generation unit 13 that generates a mute video posterior to a first video signal, in which luminance of the mute video is luminance corresponding to a value of a video feature relating to the first video signal.

According to the above configuration, a luminance value of a mute video is set to a value within a predetermined range with respect to a sense luminance value of a video signal displayed prior to a mute video in time, and thus, it is possible to reduce a difference in luminance value between the mute video and video signal displayed prior to the mute video.

In the transmitting device 1 according to Aspect 2 of the present invention, in the Aspect 1, the mute video generation unit 13 generates the mute video prior to a second video signal, and the luminance of the mute video is luminance corresponding to values of a video feature relating to the first video signal and a video feature relating to the second video signal.

According to the above configuration, it is possible reduce not only a difference in luminance value between a mute video and video signal displayed prior to the mute video, but also a difference in luminance value between the mute video and video signal displayed posterior to the mute video.

In the transmitting device 1 according to Aspect 3 of the present invention, in the Aspect 1 or 2, the video feature relating to the first video signal is a video feature within a predetermined period of the first video signal, and the video feature relating to the second video signal is a video feature within a predetermined period of the second video signal.

According to the above configuration, since a luminance value of a mute video is gradually changed from a luminance value of a video signal displayed prior to the mute video to a luminance value of a video signal displayed posterior to the mute video, and it is possible to suppress an abrupt variation of the luminance value.

In the transmitting device 1 according to Aspect 4 of the present invention, in any one aspect of the Aspects 1 to 3, the video feature is a sense luminance value representing a sense of brightness.

The transmitting device 1 according to Aspect 5 of the present invention, in the Aspect 4, the calculation unit 12 calculates the sense luminance value with reference to at least one of an average luminance, a maximum luminance, a median value of the luminance values, and MaxFALL of the video signal.

In the transmitting device 1 according to Aspect 6 of the present invention, in the Aspect 4 or 5, the calculation unit 12 calculates the sense luminance value by excluding at least one of a screen having an average luminance less than or equal to a first threshold value and a screen having an average luminance greater than or equal to a second threshold value, among display videos which are represented by the video signal, the first threshold value is a threshold value of a black screen, and the second threshold value is a threshold value of a white screen.

In the transmitting device 1 according to Aspect 1 to Aspect 6 of the present invention may be realized by a computer, and in this case, by operating the computer as each unit (software element) included in the video processing device 10, a control program of the video processing device 10 that causes the video processing device 10 to be realized by the computer, and a computer readable recording medium in which the control program is recorded are also within the scope of the present invention.

In the transmitting device 1 according to Aspect 9 of the present invention, the luminance of the mute video generated posterior to a first video signal is a value corresponding to a video feature relating to the first video signal.

According to the above configuration, a luminance value of a mute video is set to a value within a predetermined range with respect to a sense luminance value of video signal displayed prior to the mute video in time, and thus, it is possible to reduce a difference in luminance value between the mute video and video signal displayed prior to the mute video.

In the Aspect 9, the transmitting device 1 according to Aspect 10 of the present invention generates the mute video prior to a second video signal, and the luminance of the mute video is luminance corresponding to a value of a video feature of the first video signal and a value of a video feature of the second video signal.

According to the above configuration, it is possible reduce not only a difference in luminance value between a mute video and video signal displayed prior to the mute video, but also a difference in luminance value between the mute video and video signal displayed posterior to the mute video.

In the transmitting device 1 according to Aspect 11 of the present invention, in the Aspect 9 or 10, a video feature relating to the first video signal is a video feature within a predetermined period of the first video signal, and a video feature relating to the second video signal is a video feature within a predetermined period of the second video signal.

According to the above configuration, a luminance value of a mute video is gradually changed from a luminance value of a video signal displayed prior to the mute video to a luminance value of a video signal displayed posterior to the mute video, and it is possible to suppress an abrupt variation of the luminance value.

In the transmitting device 1 according to Aspect 12 of the present invention, in any one of Aspect 9 to Aspect 11, the video feature is a sense luminance value representing a sense brightness.

In the transmitting device 1 according to Aspect 13 of the present invention, in Aspect 12, the sense luminance value is calculated with reference to at least one of an average luminance, a maximum luminance, a median value of the luminance values, and MaxFALL of the video signal.

In Aspect 12 or 13, the transmitting device 1 according to Aspect 14 of the present invention calculates the sense luminance value by excluding at least one of a screen having an average luminance less than or equal to a first threshold value and a screen having an average luminance greater than or equal to a second threshold value, among the display videos representing the video signal.

The transmitting device 1 according to Aspect 9 to Aspect 14 of the present invention may be realized by a computer. In this case, by operating the computer as each unit (software element) included in the video processing device 10, a control program of the video processing device 10 that causes the video processing device 10 to be realized by the computer, and a computer readable recording medium in which the control program is recorded are also within the scope of the present invention.

The present invention is not limited to the above-described embodiments, and various modifications can be made within the scope described in the claims, and embodiments obtained by appropriately combining technical means respectively disclosed in different embodiments are also included in the technical scope of the present invention. Furthermore, new technical features can be formed by combining technical means respectively disclosed in each embodiment.

REFERENCE SIGNS LIST

1 TRANSMITTING DEVICE
10 VIDEO PROCESSING DEVICE
11 ACQUISITION UNIT
12 CALCULATION UNIT
13 MUTE VIDEO GENERATION UNIT
14 MUTE VIDEO INSERTION UNIT
20 META INFORMATION GENERATION UNIT
30 ENCODER
40 TRANSMITTING UNIT
50 CAMERA
60 RECORDER

The invention claimed is:

1. A transmitting device comprising:
a calculation unit that calculates a video feature of a transmission video signal; and
a mute video generation unit that generates a mute video posterior to a first video signal and prior to a second video signal,
wherein luminance of the mute video is luminance corresponding to a value of a video feature relating to the first video signal and a video feature relating to the second video signal.

2. The transmitting device according to claim 1,
wherein the video feature relating to the first video signal is a video feature within a predetermined period of the first video signal, and
wherein the video feature relating to the second video signal is a video feature within a predetermined period of the second video signal.

3. The transmitting device according to claim 1,
wherein the video feature is a sense luminance value representing a sense of brightness.

4. The transmitting device according to claim 3,
wherein the calculation unit calculates the sense luminance value with reference to at least one of an average luminance, a maximum luminance, a median value of the luminance values, and MaxFALL of the video signal.

5. The transmitting device according to claim 3,
wherein the calculation unit calculates the sense luminance value by excluding at least one of a screen having an average luminance less than or equal to a first threshold value and a screen having an average luminance greater than or equal to a second threshold value, among display videos which are represented by the video signal.

6. A non-transitory computer readable recording medium comprising:
the control program that causes a computer to function as the transmitting device according to claim 1.

7. A transmitting method comprising:
a calculation step of calculating a video feature of a transmission video signal; and
a mute video generation step of generating a mute video posterior to a first video signal and prior to a second video signal,
wherein luminance of the mute video is luminance corresponding to a value of a video feature relating to the first video signal and a video feature relating to the second video signal.

* * * * *